Dec. 12, 1950 G. W. CROWELL 2,534,002
POWER UNIT FOR SHIFTING GEARS OF MARINE ENGINES
Filed April 19, 1946
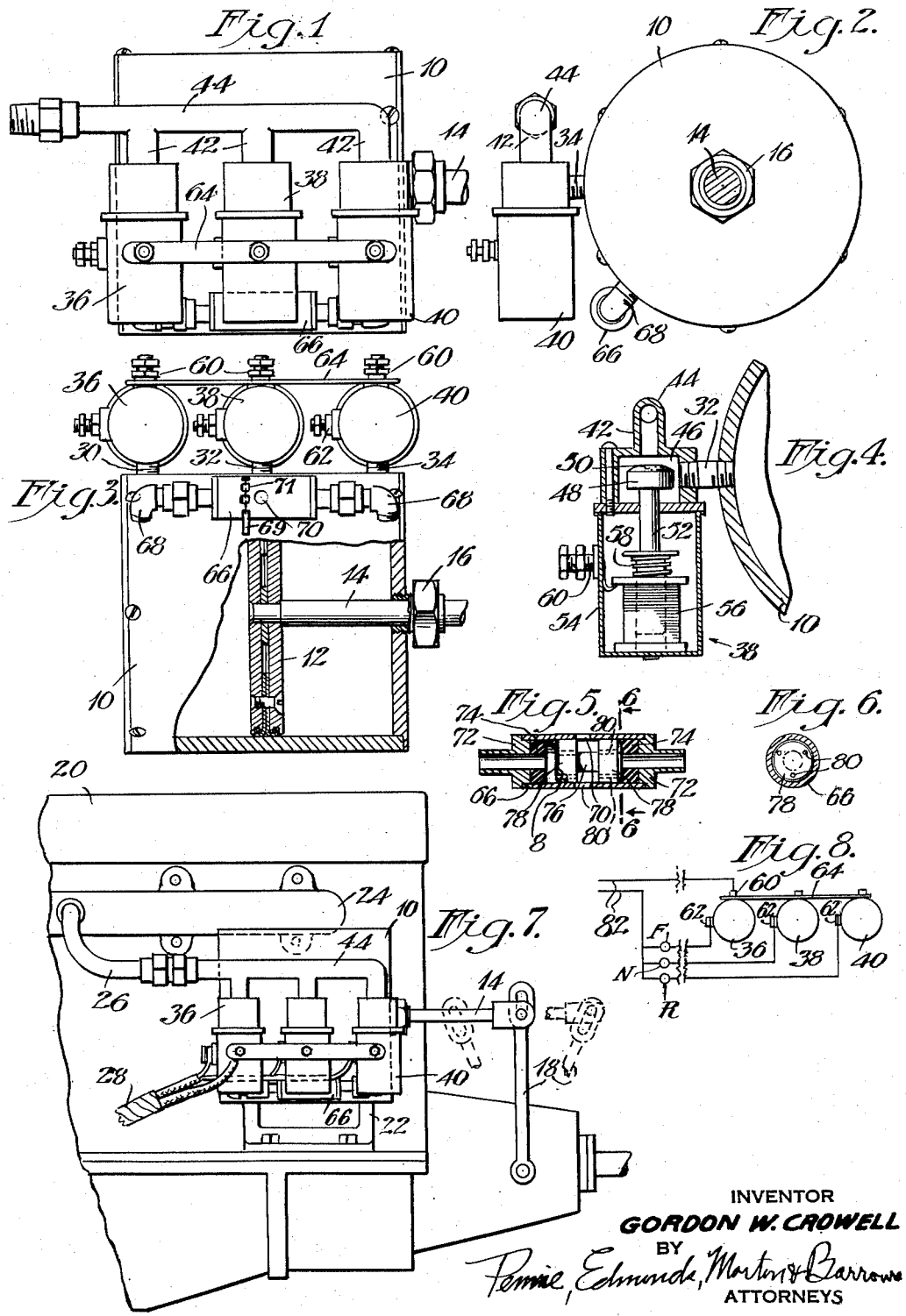
INVENTOR
*GORDON W. CROWELL*
BY
ATTORNEYS

UNITED STATES PATENT OFFICE 2,534,002

POWER UNIT FOR SHIFTING GEARS OF MARINE ENGINES

Gordon W. Crowell, Glen Ridge, N. J., assignor to Rosalie Willis, New York, N. Y.

Application April 19, 1946, Serial No. 663,430

1 Claim. (Cl. 121—38)

This invention relates to apparatus for shifting gears, and more particularly to an improved power unit for changing the gears of marine engines used for operating the smaller types of power boats.

Marine engines are usually located in positions so that some means for shifting the gears from some remote position is highly desirable. Furthermore, the gears of such engines are rather hard to shift so that considerable power is required to operate the shift lever.

I have discovered that a relatively simple power unit may be provided, for example on an internal combustion engine, which can be connected to the gear shift lever and made to effectively operate the same from some remote point by simply pressing a button for the proper position to which the gears are to be shifted. For the simple marine engines of the type referred to, only three positions are usually provided, that is forward, neutral and reverse.

The primary object of my invention is to provide an improved power unit for shifting the gears of an internal combustion engine.

Another object of the invention is to provide an improved gear shift mechanism for internal combustion engines which is operable by the suction from the engine intake manifold.

A further object of the invention is to provide a self-contained power unit which is readily connected to the apparatus to be operated.

According to my discovery I provide a power unit operating on the suction from the intake manifold of the engine and selectively utilizing such suction to shift a piston in a cylinder to the desired position, the power unit being connected up to the shift lever of the engine by means of a connecting rod between the piston and lever. According to a preferred construction the cylinder in which the piston is mounted is provided with three spaced suction outlets which connect through individual valve controlled lines into a suction line leading to the intake manifold of the engine. The valve in each line is of special construction and arranged to be operated electrically. The three outlets from the power cylinder are arranged as the suction points for the "forward," "neutral" and "reverse" positions of the gears so that the piston is drawn to the desired position when the corresponding valve is opened.

In a preferred form of my improved power means I provide a cylinder and piston construction having a plurality of spaced suction outlets in which means is provided for automatically admitting air to one side of the piston when movement of the piston is initiated by applying suction to the opposite side. In a particular form of this automatic means a reciprocating valve member is provided which is operated in response to the suction applied to the main power cylinder. The unit can also be operated by air pressure.

In general, the gear shifting apparatus of my invention includes a power piston and cylinder combination in which electrical means are employed for selecting the power shift to be made by the power means.

The apparatus of my invention includes other features and advantages which will be made apparent by the following detailed description of the apparatus taken in connection with the accompanying drawings which form a part of this application.

In the drawings:

Fig. 1 is a side elevational view of my improved apparatus for shifting gears.

Fig. 2 is an end elevational view looking from the right of the apparatus shown in Fig. 1.

Fig. 3 is a broken view partly in section of the apparatus shown in Fig. 1 looking from below.

Fig. 4 is a broken sectional view of a portion of the apparatus shown in Figs. 1–3 particularly illustrating the construction of one of the electrically operated valves.

Fig. 5 is a cross-sectional view of the automatic shift valve shown in Fig. 3.

Fig. 6 is a vertical view taken on the line 6—6 of Fig. 5.

Fig. 7 is a general broken view diagrammatically illustrating an engine and one way in which the gear shifting power means of my invention may be utilized in connection therewith.

Fig. 8 is a diagrammatic view of a wiring layout showing the electrical circuits for operating the power shift mechanism.

Referring to the drawings my improved apparatus in general comprises a power cylinder 10 in which a piston 12 is mounted and sealed by means of a gasket with respect to the cylindrical wall of the cylinder. A piston rod 14, attached to the piston extends through a packing gland 16, and as shown in Fig. 7 is attached to a gear shift lever 18.

It will be noted that in Fig. 7 my power apparatus is mounted on an engine 20 by means of a bracket 22 and that the device is connected into the intake manifold 24 by means of a suction line 26. Electrical lead wires for operating the device automatically from a remote point such as the cabin of a boat are shown at 28.

The cylinder 10 as shown in Fig. 3 is provided with three spaced outlet lines 30, 32 and 34 which respectively connect into one end, the center and the opposite end of the cylinder. These lines respectively open into electrically operated valves 36, 38 and 40 which are in turn connected by short pipe sections 42 with a pipe 44 adapted to be connected into the intake manifold of an engine such as the manifold 24 by means of the pipe 26 as shown in Fig. 7. The pipe 44 may of course be connected into any source of suction or vacuum.

The electrically operated valves 36, 38 and 40 are alike in construction and operation, the details of which are illustrated in Fig. 4 of the drawings in connection with the valve 38 which is connected into the cylinder 10 by means of the short pipe section or nipple 32. The air drawn from the cylinder 10 through the pipe 32 passes into a chamber 46, which is connected to the pipe 44 by the short connecting line 42. The chamber 46 encloses a valve closure head 48 which is provided with a covering of rubber or other suitable seating material 50 which normally sets over the inlet of the pipe 42. The head 48 is mounted on a valve stem 52 which extends into a closed chamber 54 which houses a solenoid structure 56.

The solenoid 56 is used for retracting the valve stem 52, which extends axially into the solenoid and which is retracted when the solenoid is energized. The valve head 48 is normally held in engagement with the opening to the pipe 42 by means of a spring 58 mounted between a washer attached to the stem 52 and the face of the solenoid 56, the opposite end of the solenoid being fixed to the end of chamber 54. The electrical winding of the solenoid 56 is provided with a pair of sealed connectors 60 and 62, the latter connector not being visible in Fig. 4. The electrically operated valves 36, 38 and 40 as shown in Figs. 1, 3 and 7 have their connectors 60 linked together by means of a bus bar 64.

The cylinder 10 of the power unit is provided with an automatic operating means for admitting air to opposite sides of the piston 12 this means including an air inlet valve 66 as shown in Fig. 3, the opposite ends of which are connected by suitable pipe couplings 68 into the cylinder 10 at points respectively adjacent its opposite heads.

The structure of the air inlet valve 66 is shown more in detail in Figs. 5 and 6, in which it will be seen that the valve includes an outer casing provided with centrally located opposite air inlet openings 70. Each end of the valve 66 includes a head 72 and an axial passageway coinciding with the end short pipe sections. On the inside of each head 72 and resting thereagainst is an annular relatively thick rubber gasket 74 having a central opening corresponding to that in the head 72. A movable spool-like valve member 76 is mounted between the gaskets 74 and is adapted to shift from a position against one gasket to a position against the other gasket in response to suction applied to a particular part of the cylinder 10. The spool-like member 76 has a limited range of movement so that its central open portion is always in communication with the openings 70 in the valve casing.

The spool-like member includes spaced cylindrical end pieces 78, the outer surfaces of which are adapted to slide freely on the inner surface of the cylinder casing of the valve. Each of the end pieces 78 have a slightly beveled outer edge and are provided with holes 80 which are adapted to conduct air from the space between these members through to the space at either end of the spool-like member 76. The holes 80 are parallel to the axis of the member 76 and in such position that they are closed when the member is brought into engagement with one of the gaskets 74. Fig. 5 shows the member 76 in a position so that the holes 80 in the right-hand end piece 78 are closed by the adjacent gasket 74 so that air drawn through the openings 70 will pass through the holes 80 at the opposite end and into the cylinder 10 on the left side of the piston 12.

The wiring arrangement for the automatic operation of the valves 36, 38 and 40 is shown in Fig. 8 of the drawings in which a pair of lead wires 82, for supplying current from a battery or other suitable source of electricity are connected into the valves. One of the wires as shown is connected to a terminal 60 and to all of the terminals 60 by means of the bus bar 64. The other lead wire 82 connects into a control panel which for example may be mounted in the cabin of the boat or at any other convenient place where it is wired into three push buttons marked F, N and R, i. e. for respectively shifting the gears to "forward," "neutral" and "reverse." The push button F is wired into the connector 62 of valve 36, the push button N is wired into the connector 62 of valve 38, while the push button R is wired into the connector 62 of valve 40. The arrangement is such that when the operator presses the push button F the solenoid 56 in the valve 36 is energized so that the valve is opened and suction is applied through the line 30 to draw the piston 12 and the piston rod 14 to the left thereby shifting the lever 18 to the left and putting the gears into a position for "forward" motion of the boat. When the N button is pressed by the operator the piston 12 is shifted to the center position as shown in Fig. 3 and the gears are disengaged. When the operator presses the R button the valve 40 is energized and operated so that suction is applied to the right side of the piston 12 so that the gears are shifted to reverse.

In the foregoing described series of operations it will be apparent that when one of the buttons is pressed by the operator and suction is applied to the cylinder 10, air must be admitted to the cylinder on the side of the piston opposite to that to which the suction is applied. Assuming for purposes of illustration that the piston 12 is in the position shown in Fig. 3, that the spool-like member 76 is in the position shown in Fig. 5, and that it is desired to shift the gears to the "forward" position, the operator presses the button F which opens the valve 36 to apply suction to the left side of the piston 12 through the pipe 30. Suction is therefore immediately applied through the connector 68 to the left side of the air inlet valve 66. Air, therefore rushes in through the openings 70 and in view of the relatively small holes 80, immediately shifts the spool-like member 76 against the left gasket 74 so that the holes 80 in the left end of the spool 76 are closed. Suction therefore will now be effective for moving the piston 12 to the left in Fig. 3, and air to permit this movement will flow through the openings 70, the set of holes 80 in the right end of the spool 76, and through the connections 68 into the cylinder 10 on the right side of the piston 12. The operator keeps the button F down until the gear shift is complete. As soon as the button F is released and the circuit interrupted the valve stem 52 is automatically operated by the spring 58 to close the pipe 42 from the valve 36.

When the "neutral" N button is pressed by the operator and suction applied through the pipe 32 (Fig. 3) the piston 12 will be moved from either of its end positions to the center position as shown in Fig. 3, and in this operation the automatic valve 66 will operate to admit air automatically to the side of the piston opposite to that on which suction is applied. The valve 66 will operate in a manner identical with that described above in connection with the shift of the piston 12 by the valve 36. In all of these operations the automatic air inlet valve 66 functions first in response to suction to stop the admission of air to the side of the piston 12 on which suction is applied, and thereafter to admit air to the opposite side of the piston. The valve 66 therefore is set automatically in response to the suction applied by the opening of one of the valves 36, 38 or 40.

The gear shifting apparatus of the present invention may be used for other purposes by making suitable changes, and the apparatus of course may be used as a power means for making a shift of various types of mechanism to several different positions of use, such as the series of three positions provided for in the preferred form of apparatus as described. In utilizing the apparatus for shifting gears of boats it will be apparent that the unit may be located in a very inaccessible position from the standpoint of its operation and at the same time utilize the apparatus for shifting the gears by simply using the suction available at the intake manifold of the engine and the electricity available at the battery or generator normally provided on the engine. From the showing in Fig. 7 it will be seen that the power apparatus for shifting gears may be of relatively light weight and will occupy a relatively small space in the engine compartment. Various other advantages for the improved apparatus will be apparent to those familiar with operating engines of the type referred to.

The power apparatus of the present invention may be modified in certain respects to accomplish the desired result. It may be mounted in any desired position and various leverage means may be provided for connecting the piston rod 14 with the lever or other means to be operated thereby, the showing in Fig. 7 being merely provided for the purpose of illustrating one way in which the apparatus may be combined with an engine. If for any reason there is a failure of suction for the device, it may be made so that it will not oppose manual operation by placing a pin in one of the openings 70 to hold the valve member 78 in a position so that air can flow freely to both sides of the piston 12, such as pin 69, attached by chain 71.

When it is desired to provide for more than three positions for the piston 12, additional intermediate outlets such as 32, and the associated valves 38 and their connections are provided, the outlets being spaced along the cylinder 10 as required.

While suction through the line 44 provides the force for shifting the piston 12, it will be understood that the force is applied by the pressure of the air admitted through the openings 70 in the valve 66. In using the power unit with Diesel or other engines in which no source of suction is available, any pressure medium, preferably a gas such as air under pressure from the engine system or from an air pump or compressor may be applied through the openings 70 in the valve 66. In such an operation the pipes 42 or the pipe 44 will be open to atmosphere.

The changes and modifications referred to are contemplated as coming within the spirit and scope of the invention as defined by the appended claim.

What I claim as new is:

In a power apparatus for applying power by means of a cylinder and piston, the latter of which has a piston rod attached thereto for applying the power in either direction of its motion, a pipe having branch lines connecting into said cylinder at opposite ends and in its central portion, valves in said lines normally maintained in closed position, means for automatically opening a selected one of said valves for the application of suction to a predetermined portion of said cylinder, means for admitting air to said cylinder at the opposite ends thereof, said last mentioned means including pipes leading from opposite ends of said cylinder respectively into opposite ends of a cylindrical casing having a central port opening to the atmosphere, a spool-like member slidable in said casing including spaced cylindrical members, relatively small holes through said cylindrical members parallel to the axis thereof, and means for closing-off the holes in one of said members when the member moves toward the end of the casing adjacent thereto, said movement being adapted to permit the flow of air through the holes in the opposite member and through the adjacent pipe into the cylinder.

GORDON W. CROWELL.

REFERENCES CITED

The following references are of record in the file of this patent:

UNITED STATES PATENTS

| Number | Name | Date |
| --- | --- | --- |
| 1,952,806 | Hyland | Mar. 27, 1934 |
| 1,963,444 | Mullins | June 19, 1934 |
| 2,156,118 | Kliesrath | Apr. 25, 1939 |
| 2,157,328 | Durham | May 9, 1939 |
| 2,206,771 | Dugas | July 2, 1940 |
| 2,396,787 | Hawthorne | Mar. 19, 1946 |
| 2,398,997 | Berry | Apr. 23, 1946 |